Patented Aug. 16, 1949

2,478,932

UNITED STATES PATENT OFFICE 2,478,932

MANUFACTURE OF 1,1,1-TRIFLUORO-ETHANE

Charles B. Miller, St. Albans, and Francis H. Bratton, Floral Park, N. Y., assignors to Allied Chemical & Dye Corporation, a corporation of New York No Drawing. Application April 2, 1947, Serial No. 738,942

7 Claims. (Cl. 260—653)

This invention relates to the preparation of organic halides rich in fluorine. More specifically, the present improvements are directed to processes for making aliphatic fluoro compounds rich in fluorine from aliphatic fluoro compounds of lower fluorine content.

Many processes are known for fluorinating organic compounds. Thus, it has been proposed to employ fluorine, hydrogen fluoride, or metallic fluorides such as mercuric fluoride and antimony trifluoride as fluorinating agents with or without catalysts.

The principal object of our invention is to provide for manufacture of aliphatic fluoro derivatives rich in fluorine from aliphatic halofluoro derivatives of lower fluorine content by processes which do not require the use of fluorinating agents which are expensive, difficult to make and which are troublesome to handle and use. Another object is provision of processes for preparing fluoro derivatives of ethane containing a high fluorine content, and halofluoro derivatives of ethylene from fluohalides of ethane by means of easily controlled catalytically effected disproportionation and dehydrohalogenation operations. More specifically, the invention aims to afford a process for the preparation of 1,1,1-trifluoroethane and 1,1-chlorofluoroethylene from 1,1,1-chlorodifluoroethane.

Other objects and advantages of the invention will appear from the following detailed description.

As applied particularly to the manufacture of 1,1,1-trifluoroethane and 1,1-chlorofluoroethylene, in accordance with the invention, we have found that these materials may be prepared by disproportionation and dehydrofluorination by heating 1,1,1-difluorochloroethane in the presence of a hereafter described aluminum fluoride catalytic material at a temperature not greater than 500° C., but sufficiently high to effect formation of 1,1,1-trifluoroethane. Preferably, reaction temperature is not substantially less than 250° C.

In the general practice of our process, 1,1,1-difluorochloroethane, a gas at room temperature, is passed into and through a suitable reaction zone containing an aluminum fluoride catalytic material and maintained at a temperature not less than 250° C. and not greater than 500° C. With respect to formation of principal products, it is believed that the reactions effected may be summarized by the following—

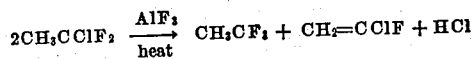

The reaction zone exit gas also contains some unreacted $CH_3CClF_2$.

In the more specific practice of our process, the normally gaseous 1,1,1-chlorodifluoroethane may be passed through a flowmeter into a suitably jacketed graphite reactor tube which is packed with lumps or pellets of the aluminum fluoride catalytic material. The reactor tube may be mounted in an electric furnace automatically controlled to maintain the reaction zone in the tube at the desired reaction temperature.

The various reaction products may be recovered separately or in admixture from the reaction zone exit gas stream in any suitable manner. The gas discharged from the reaction zone may be scrubbed with a caustic soda solution to remove from the gas stream HCl and any possible traces of HF, and then dried by means of anhydrous calcium chloride. The clean dry gas stream may be then introduced into a condenser cooled to a temperature well below the boiling points of $CH_3CF_3$ (—46.7° C.) $CH_2=CClF$ (—25.5° C.), and $CH_3CClF_2$ (—9.6° C.), as by means of a Dry Ice-acetone mixture. The individual reaction products may be recovered from the condensate by fractional distillation under suitable conditions, and the unreacted $CH_3CClF_2$ thus obtained may be recycled to a succeeding operation.

While the exact mechanisms of the disproportionation and dehydrofluorination reactions taking place in the practice of our invention are not wholly understood, it is believed, however, that the aluminum fluoride acts essentially as a catalyst at the high temperatures stated since no appreciable amount of aluminum chloride has been found in the reaction zone exit gas. At the temperatures indicated, the aluminum fluoride catalyst brings about a disproportionation of the original halofluoro compound, e. g. 1,1,1-chlorodifluoroethane, which results in a redistribution of fluorine and chlorine atoms present, accompanied by a dehydrofluorination of said 1,1,1-chlorodifluoroethane, to produce the more highly fluorinated 1,1,1-trifluoroethane and the unsaturated 1,1-chlorofluoroethylene. Operations show that the composition of the aluminum fluoride does not change and hence it appears that the aluminum fluoride does not act as a fluorinating agent in the usual sense and provides substantially no available fluorine during the course of the reaction.

The aluminum fluoride catalytic material which we employ in the reaction may be (a) substantially pure aluminum fluoride, or (b) a complex basic aluminum fluoride, or (c) mixtures of both. In any case, the catalytic material should contain not less than 55 parts by weight of fluorine per 100 parts by weight of such material; these values referring to the catalytically effective material per se without regard to any non-deleterious or inert solid substances which are incidentally present as impurities or diluents. It is preferred to employ aluminum fluoride which is as pure as commercially feasible.

We find that in order to initiate to any reasonably satisfactory extent the disproportionation and dehydrofluorination reactions described, temperatures in the reaction zone should not be substantially less than the 250° C. stated. Yields of the sought-for highly fluorinated reaction products, e. g. 1,1,1-trifluoroethane, increase at higher temperatures. In order to avoid decomposition, loss of other valuable reaction products, e. g. 1,1-chlorofluoroethylene, and decreased yields of the chief product, 1,1,1-trifluoroethane, reaction zone temperatures should not exceed about 500° C. and preferably not more than 400° C. Good commercial yields are obtained when reaction zone temperatures are held substantially within the range of 250°-400° C., and best over-all results may be secured when operating at temperatures of the order of 300°-400° C.

Any suitable chamber or reactor tube constructed of inert material may be employed for carrying out the reaction, provided the reaction zone afforded is of sufficient length and cross-sectional area to accommodate the required amount of aluminum fluoride catalytic material necessary to provide adequate gas contact area, and at the same time afford sufficient free space for passage of the gas mixture at an economical rate of flow. In practice of the invention, rate of feed of incoming gas into the reaction zone may be any suitable value, depending upon the conditions at hand, such as to afford reaction time sufficient to facilitate good commercial recoveries of products.

The 1,1,1-trifluoroethane and 1,1-chlorofluoroethylene prepared by the process of the invention are utilizable particularly as a refrigerant and monomer respectively, and as intermediates in the chemical industries.

The following example serves to illustrate in some detail the practice of our invention:

A reactor tube was packed with aluminum fluoride pellets prepared from reagent-grade material which was substantially pure aluminum fluoride. The reactor tube was constructed of glass, and had an inside diameter of 25 mm. The tube contained a catalyst bed 15 inches long, thus providing an aluminum fluoride volume of 190 cc. The tube was heated in an electric furnace and maintained at 325° C. by a control potentiometer.

439 parts (by weight) of gaseous 1,1,1-chlorodifluoroethane were passed through the reactor tube at a rate of 100 parts per hour. The exit gas of the reaction zone was then passed into a condenser cooled to about −78° C. by means of a Dry Ice-acetone mixture, and 340 parts of condensate were thus obtained. The condensate so collected was fractionated to recover the individual components, indicating the following amounts of products:

| | Parts |
|---|---|
| $CH_3CF_3$ | 122 |
| $CH_2=CClF$ | 106 |
| $CH_3CClF_2$ | 116 |

These materials represent a fluorine recovery of 91% and a carbon recovery of 90%. The major product formed was $CH_3CF_3$ which contained 50% of the fluorine charged while $CH_2=CClF$ represented 15% of the fluorine charged.

We claim:

1. The process which comprises heating 1,1,1-difluorochloroethane at a temperature not less than 250° C. and not greater than 500° C. in the presence of an aluminum fluoride catalytic material of the group consisting of aluminum fluoride, a complex basic aluminum fluoride and mixtures thereof, said catalytic material containing not less than 55 parts by weight of fluorine per 100 parts by weight of said catalytic material.

2. The process which comprises heating 1,1,1-difluorochloroethane at a temperature not less than 250° C. and not greater than 500° C. in the presence of an aluminum fluoride catalytic material of the group consisting of aluminum fluoride, a complex basic aluminum fluoride and mixtures thereof, said catalytic material containing not less than 55 parts by weight of fluorine per 100 parts by weight of said catalytic material, and recovering 1,1,1-trifluoroethane from the resulting reaction mixture.

3. The process which comprises heating 1,1,1-difluorochloroethane at a temperature not less than 250° C. and not greater than 500° C. in the presence of substantially pure aluminum fluoride, and recovering 1,1,1,-trifluoroethane from the resulting reaction mixture.

4. The process of producing 1,1,1-trifluoroethane and 1,1-chlorofluoroethylene by disproportionation and dehydrohalogenation, comprising contacting 1,1,1-difluorochloroethane with an aluminum fluoride catalytic material of the group consisting of aluminum fluoride, a complex basic aluminum fluoride and mixtures thereof, said catalytic material containing not less than 55 parts by weight of fluorine per 100 parts by weight of said catalytic material, at a temperature not less than 250° C. and not greater than 500° C.

5. The process which comprises heating 1,1,1-difluorochloroethane at a temperature in the range of 250° to 400° C. in the presence of an aluminum fluoride catalytic material of the group consisting of aluminum fluoride, a complex basic aluminum fluoride and mixtures thereof, said catalytic material containing not less than 55 parts by weight of fluorine per 100 parts by weight of said catalytic material.

6. The process of producing 1,1,1-trifluoroethane and 1,1-chlorofluoroethylene by disproportionation and dehydrohalogenation, comprising contacting 1,1,1-difluorochloroethane with an aluminum fluoride catalytic material of the group consisting of aluminum fluoride, a complex basic aluminum fluoride and mixtures thereof, said catalytic material containing not less than 55 parts by weight of fluorine per 100 parts by weight of said catalytic material, at a temperature in the range of 300° to 400° C.

7. The process of producing 1,1,1,-trifluoroethane and 1,1-chlorofluoroethylene by disproportionation and dehydrohalogenation, comprising passing 1,1,1-difluorochloroethane into a reaction zone containing substantially pure aluminum fluoride and maintained at a temperature in the range of 300° to 400° C., and recovering 1,1,1-trifluoroethane and 1,1-chlorofluoroethylene from the reaction zone exit gas.

CHARLES B. MILLER.
FRANCIS H. BRATTON.

REFERENCES CITED

The following references are of record in the file of this patent:

UNITED STATES PATENTS

| Number | Name | Date |
|---|---|---|
| 1,994,035 | Croco | Mar. 12, 1935 |
| 2,426,637 | Murray | Sept. 2, 1947 |
| 2,426,638 | Murray | Sept. 2, 1947 |